March 23, 1954
H. J. HEPP
2,673,226
DECHLORINATION OF HYDROCARBONS
CONTAINING ORGANIC CHLORINE
Filed June 29, 1950
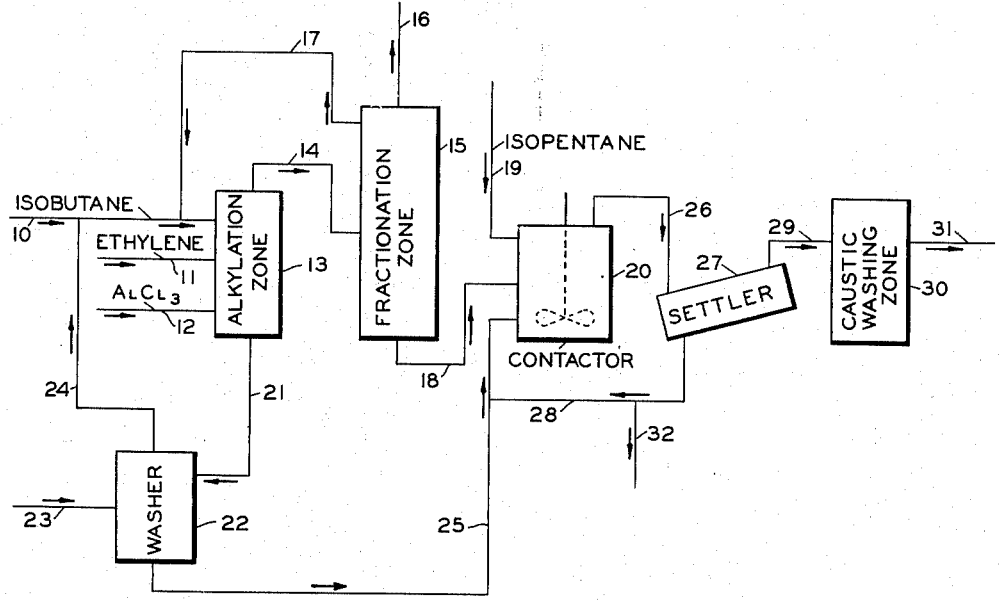
INVENTOR.
H. J. HEPP
BY
Hudson + Young
ATTORNEYS Patented Mar. 23, 1954

2,673,226

UNITED STATES PATENT OFFICE 2,673,226

DECHLORINATION OF HYDROCARBONS CONTAINING ORGANIC CHLORINE

Harold J. Hepp, Bartlesville, Okla., assignor to Phillips Petroleum Company, a corporation of Delaware Application June 29, 1950, Serial No. 171,035

10 Claims. (Cl. 260—683.4)

This invention relates to the reduction of the organic chlorine content of hydrocarbons.

The treatment and conversion of hydrocarbons in the presence of aluminum chloride has been known and practiced for many years. Among these processes are cracking, isomerization, alkylation, lubricating oil treatment, and numerous others. These conversions yield a product containing varying small amounts of organically bound chlorine in the product; and in some instances, the presence of the chlorine is quite undesirable. The organic chlorine is especially undesirable in an alkylate destined for use in a spark ignition, internal combustion engine because excessive chlorine is quite detrimental to octane rating and lead response.

The organic chlorine appears to be present in paraffin alkylates as alkyl chlorides and is substantially unaffected by an ordinary caustic wash.

The reduction of chlorine content of these alkylates and similar hydrocarbons has been most commonly effected by dehydrochlorination over a solid catalyst such as quick lime on bauxite. This process is described in U. S. 2,413,871.

I have now found another process whereby the chlorine content of hydrocarbons containing organic chlorine can be reduced. The process comprises the steps of contacting the chlorine-containing hydrocarbon with an active, fluid, aluminum chloride-hydrocarbon complex preferably in the presence of a saturated hydrocarbon, separation of the hydrocarbon and complex, and washing the treated hydrocarbon with water and/or an alkaline solution. The saturated hydrocarbon may be one or more present in the feed to the process or may be one or more hydrocarbons added to the feed, e. g. an isoparaffin.

In carrying out the process, the temperature is maintained between 50° F. and 150° F., preferably between 60° F. and 130° F. The process is carried out in liquid phase, the pressure maintained in the reaction zone being sufficiently high to maintain liquid phase. The reaction time is dependent on both temperature and efficiency of contact of the catalyst and hydrocarbon. The reaction time is usually between 5 and 60 minutes, though under some reaction conditions, it may be outside these limits. Five to fifty volume per cent catalyst is satisfactory, though 20 to 40 volume per cent is preferred. The catalyst is an aluminum chloride-hydrocarbon complex having a heat of hydrolysis in the range of 280–375 calories per gram. This type of catalyst is well known in the art as a paraffin-olefin alkylation catalyst.

The contact between the hydrocarbon and catalyst can be effected in any of several ways. The contacting methods include mechanical agitation, jet agitation, circulation through tubes under turbulent flow conditions, or other means of effectively contacting the two phases.

Following the contacting, the two phases are preferably separated by means of gravity, though centrifuging or similar means may be employed. In gravity settling, the emulsion of catalyst and hydrocarbon is introduced into a tank wherein substantially quiescent conditions are maintained. Under these conditions, the catalyst phase settles to the bottom and is withdrawn and recycled to the reaction zone, and the hydrocarbon is removed to a caustic washing zone. The hydrocarbon is then caustic washed to remove any dissolved catalyst or hydrogen chloride. Caustic washing is accomplished by conventional means.

The attached figure is a diagrammatic drawing of one specific embodiment of this invention wherein an alkylate produced by alkylation of isobutane with ethylene in the presence of a fluid aluminum chloride-hydrocarbon complex is treated to reduce its organic chlorine content.

Fresh isobutane is introduced through line 10, to this being added wash isobutane through line 24 and recycle butane through line 17, the combined stream then being conducted to alkylation zone 13. Also to zone 13 are added ethylene or ethylene-propylene mixtures through line 11 and aluminum chloride through line 12. This alkylation process, including reaction conditions and apparatus, is well known to those skilled in the art and will not be described in detail here. The operations effected herein are the alkylation reaction, separation of the reactor effluent into a hydrocarbon phase and a catalyst phase, caustic washing of the hydrocarbon phase and recycle of the requisite portion of the catalyst to the reactor. The caustic washed hydrocarbon phase is withdrawn from zone 13 through line 14 and conducted to fractionation zone 15. In this zone the hydrocarbon is fractionated to produce a propane and lighter fraction, removed through 16 and conducted to suitable utilization not shown, an isobutane fraction which is removed through line 17 and then recycled to the alkylation zone through line 10. The $C_5+$ alkylate is removed through line 18 and conducted to dechlorination contactor 20.

The excess fluid catalyst formed in zone 13 is removed through line 21 and conducted to washer 22. Here the complex is washed by a countercurrent stream of isobutane introduced through line 23, the isobutane stream picking up the hydrogen chloride dissolved in the complex. The wash isobutane is removed through line 24 and conducted to line 10, then following a previously described route. The washed complex is withdrawn through line 25 and conducted to contactor 20. In contactor 20, the fluid aluminum chloride-hydrocarbon complex is contacted with the chlorine-containing alkylate. The alkylate is comprised principally of branched-chain paraffins, diisopropyl being the main constituent present but there being substantial amount of isopentane and higher-boiling branched-chain hydrocarbons. The dechlorination has been found to take place more readily in the presence of a substantial amount of isobutane or isopentane, and consequently, if isopentane is to be blended along with the diisopropyl to produce the final gasoline, it is quite advantageous to add this isopentane through line 19 to contactor 20. The outside isopentane eventually to be used thus contributes a desirable effect during dechlorination as well as functioning as a blending agent when the diisopropyl is blended. The dechlorination may take place, in part, through simple alkylation of an isoparaffin with the alkyl chloride yielding a higher isoparaffin and hydrogen chloride. Regardless of the explanation, the added hydrocarbon is also beneficial as a diluent, thus preventing undesired molecular rearrangement of the alkylate, especially at the higher dechlorination temperatures.

The effluent of contactor 20, comprising dechlorinated hydrocarbon, catalyst and dissolved catalyst or hydrogen chloride, is removed through line 26 to settler 27. In the settler, the catalyst phase, due to its higher density, settles to the bottom and is withdrawn through line 28 and a major portion passed to line 25 and recycled to contactor 20. A minor portion of the catalyst is removed through line 32 to aluminum chloride recovery, not shown. Only sufficient catalyst is removed through line 32 to maintain a constant volume of catalyst in contactor 20, for discarded alkylation catalyst continuously enters contactor 20.

The hydrocarbon phase separated in settler 27, including a small amount of dissolved hydrogen chloride and aluminum chloride, is removed through line 29 to caustic washing zone 30, wherein the dissolved aluminum chloride and hydrogen chloride are removed. The washed hydrocarbon is removed from zone 30 through line 31 to suitable utilization, which may be direct blending in motor fuel, storage, or fractionation to separate the heavy alkylate and subsequent blending in aviation and motor fuels and/or storage.

Example I

In the runs the desired quantity of a synthetic raw alkylate containing the proper amount of organic chlorine was prepared by mixing diisopropyl and secondary butyl chloride. This synthetic alkylate, a quantity of catalyst, and isopentane when used were introduced into a three necked 500 cc. round bottomed flask equipped with a water cooled condenser and a mercury-seal stirrer. Stirring was then begun and continued for the desired length of time. The two phases in the flask were then separated with a separatory funnel; and the hydrocarbon layer was washed successively with distilled water, dilute aqueous sodium hydroxide, and again with distilled water. In the case of treatment with zinc, the alkylate was refluxed while being stirred with zinc powder in the same equipment.

The chemicals used were:

(1) Diisopropyl—99 mol per cent minimum purity.
(2) Isopentane—99 per cent minimum purity.
(3) $AlCl_3$-hydrocarbon complex—Contained 57 wt. per cent $AlCl_3$ as determined by heat of hydrolysis. It was obtained from spent catalyst disposal of a diisopropyl unit.
(4) $BF_3$-ether adduct—Used without further purification (45% $BF_3$).
(5) Sulfuric acid—94.5–95.5% $H_2SO_4$.
(6) Sec.-butyl chloride—B. P. 67.5–69.5° C.—Used without further purification.
(7) Zinc—CP; powdered.

The summary of experimental conditions and results is attached.

DECHLORINATION OF SYNTHETIC DIISOPROPYL "ALKYLATES" WITH $AlCl_3$-HYDROCARBON COMPLEX, $H_2SO_4$, $BF_3$-ETHER COMPLEX AND METALLIC ZINC

| Run No. | Catalyst Used | "Alkylate" Composition | ccs. of Feed Used | ccs. of Catalyst Used | Contact Time (Hours) | Cl Content of Feed, wt. per cent | Cl Content of Treated Product, wt. per cent | Percent Cl Removal | Temperature, °F. |
|---|---|---|---|---|---|---|---|---|---|
| 1 | Concentrated $H_2SO_4$ | Pure Diisopropyl+Sec.-Butyl Chloride. | 100 | 35 | 1.0 | 0.13 | 0.11 | 15 | 100 |
| 2 | $BF_3$-Ether | 50-50 DIP+Isopentane+Sec.-Butyl Chloride. | 100 | 20 | 2.0 | 0.112 | 0.106 | 9 | 80 |
| 3 | $AlCl_3$ Sludge | Pure Diisopropyl+Sec.-Butyl Chloride. | 100 | 30 | 1.3 | 0.23 | 0.13 | 44 | 80 |
| 4 | $AlCl_3$ Sludge | 50-50 DIP+Isopentane+Sec.-Butyl Chloride. | 100 | 30 | 1.0 | 0.26 | 0.068 | 74 | 80 |
| 5 | $AlCl_3$ Sludge | ----do---- | 100 | 5 | 2.5 | 0.24 | 0.076 | 68 | 80 |
| 6 | $AlCl_3$ Sludge | ----do---- | 100 | 30 | 4.5 | 0.22 | 0.070 | 68 | 80 |
| 7a | $AlCl_3$ Sludge | ----do---- | 100 | 30 | 1.0 | 0.22 | 0.045 | 80 | 80 |
| 8 | $AlCl_3$ Sludge | ----do---- | 100 | 30 | 2.0 | 0.072 | 0.012 | 83 | 80 |
| 9b | $AlCl_3$ Sludge | Diisopropyl+Isopentane but no Sec.-Butyl Chloride. | 100 | 30 | 1.5 | 0.005 | 0.009 | | 80 |
| 10c | None | Diisopropyl | 50 | None | 1.0 | 0.119 | 0.115 | | 80 |
| 11 | Powdered Zinc | 35 DIP-65 Dimethylpentanes +Sec.-Butyl Chloride. | 100 | 10 gms. | 1.0 | 0.128 | 0.121 | 9 | 160 | a Passed stream of $N_2$ through flash during treating period.
b A blank run to demonstrate that the $AlCl_3$-hydrocarbon complex adds no organic chlorine to the "alkylate."
c A blank run to demonstrate that the dilute caustic used to neutralize traces of HCl and $AlCl_3$ does not remove organic chlorine.

It is particularly noteworthy that neither sulfuric acid nor $BF_3$-ether complex, runs 1 and 2, were effective to remove any real quantity of chlorine from the treated alkylate material. Thus, it appears to be clear that the mechanism of the chlorine removal reaction is not likely to be one of simple alkylation alone in view of the very well known alkylation promoting activity of the said sulfuric acid and BF₃-ether complex.

The presence of HCl during the dechlorination is apparently not harmful as shown in the following example.

*Example II*

Diisopropyl alkylate was treated with spent AlCl₃ hydrocarbon complex in a stirred contactor for the stated length of time. At the end of this reaction period the hydrocarbon and sludge phases were separated. The hydrocarbon phase was then washed succesively with aqueous NaOH and with water. The washed product was analyzed for chlorine.

|  | Run A | Run B¹ |
|---|---|---|
| Temperature °F | 120 | 80 |
| AlCl₃ Complex Used cc | 30 | 60 |
| DIP Alkylate Used cc | 120 | 200 |
| Stirring Time hr | 1.5 | 2.0 |
| Chlorine in Alkylate Charged weight percent | 0.278 | 0.278 |
| Chlorine in Treated Alkylate weight percent | 0.030 | 0.018 |
| Chlorine Removal percent | 89 | 94 |

¹ Dry HCl was passed through the reaction zone during the course of this run.

The above data demonstrate excellent dechlorination of commercially produced alkylate in either the presence or absence of any added hydrogen chloride.

*Example III*

Isobutane and ethylene, in a mol ratio of 5 to 1, were reacted by efficiently contacting them with an active AlCl₃-hydrocarbon complex for twenty minutes at 130° F. in the presence of about 0.3 weight per cent of HCl. The resulting alkylate was washed with caustic at 130° F. and then subjected to dechlorination. 100 cc. of the caustic-washed alkylate and 30 cc. of the AlCl₃-hydrocarbon complex described above were stirred together in a glass flask at 80° F. for 1.25 hours. The alkylate was recovered, washed with caustic, and the residual chlorine was determined. The chlorine content in the alkylate prior to treatment was 0.278 weight per cent and after dechlorination it was 0.149 weight per cent. This amounts to a reduction in organic chlorine content of 47 weight per cent.

Reasonable variation and modification are possible within the scope of the foregoing disclosure and the appended claims to the invention the essence of which is that organically bound chlorine, it has been discovered, can be removed substantially from hydrocarbons containing them by treating said hydrocarbons with an aluminum chloride hydrocarbon complex preferably in the presence of an alkylatable hydrocarbon.

I claim:

1. In a process for the preparation of a hydrocarbon conversion product in which there is employed an aluminum chloride catalyst to effect the said conversion and in which following said conversion and after separation of the catalyst from the products of said conversion the said catalyst-free products contain residual quantities of organically-bound chlorine, the step of contacting said catalyst-free products with an active, fluid, aluminum chloride-hydrocarbon complex catalyst, which contains free aluminum chloride, having a heat of hydrolysis in the range of 230–375 calories per gram to remove substantially the said residual quantities of chlorine.

2. In a process for the preparation of a hydrocarbon conversion product in which there is employed an active aluminum chloride conversion catalyst to effect the said conversion and in which following said conversion and after separation of the catalyst from the products of said conversion the said catalyst-free products contain small residual quantities of organically-bound chlorine, the step which comprises contacting said catalyst-free products containing said small residual quantities of organically-bound chlorine with an additional quantity of an active, fluid, aluminum chloride-hydrocarbon complex catalyst, which contains free aluminum chloride, to remove substantially the said small residual quantities of chlorine.

3. In a process for the preparation of a hydrocarbon conversion product in which there is employed an aluminum chloride catalyst to effect the said conversion and in which following said conversion and after separation of the catalyst from the products of said conversion the said catalyst-free products contain residual quantities of organically-bound chlorine, the step of contacting said catalyst-free products with an active, fluid, aluminum chloride-hydrocarbon complex catalyst, which contains free aluminum chloride, to remove substantially the said residual quantities of chlorine.

4. A process of claim 3 in which the catalyst-free products are admixed with a saturated hydrocarbon before being contacted with said aluminum chloride-hydrocarbon complex.

5. A process for the preparation of a hydrocarbon conversion product in which there is employed an aluminum chloride catalyst to effect the said conversion and in which following the said conversion and after separation of the catalyst from the product of said conversion the said catalyst-free product contains residual quantities of organically-bound chlorine, the steps which comprise fractionating the said product into fractions each of which contains residual quantities of organically-bound chlorine and contacting one of said fractions with an active, fluid, aluminum chloride-hydrocarbon complex catalyst, which contains free aluminum chloride, to remove substantially the said residual quantity of chlorine from said fraction.

6. A process according to claim 5 wherein the said conversion product is treated with caustic to wash the same prior to the fractionation step.

7. A process for the alkylation of an isoparaffin with an olefin in the presence of an aluminum chloride-hydrocarbon complex catalyst which comprises the steps of contacting said isoparaffin and olefin with said catalyst to prepare a hydrocarbon phase containing organically-bound chlorine, separating from said hydrocarbon phase all catalyst therein, then contacting said hydrocarbon phase containing organically-bound chlorine with an active aluminum chloride-hydrocarbon complex catalyst, which contains free aluminum chloride, to remove said residual chlorine therefrom.

8. A process according to claim 7 wherein said hydrocarbon phase is caustic washed prior to the said treatment with aluminum chloride-hydrocarbon complex.

9. A process according to claim 7 wherein an alkylate is recovered from said hydrocarbon phase, the said alkylate is caustic washed and then contacted with said aluminum chloride-hydrocarbon complex.

10. The production of an alkylate product from isobutane and ethylene by contacting the same in the presence of a fluid aluminum chloride-hydrocarbon complex catalyst which comprises passing said isobutane and ethylene into contact with the said catalyst under conditions to cause alkylation of the said isobutane with the said ethylene, separating all of the said catalyst from the alkylation effluent obtained, treating said alkylation effluent with an alkaline washing medium, fractionating said washed alkylation effluent to obtain therefrom a fraction having a high octane value, admixing said fraction having a high octane value with an alkylatable hydrocarbon, then contacting said fraction admixed with said alkylatable hydrocarbon with an active, fluid, aluminum chloride-hydrocarbon complex at a temperature in the range 50–150° F. for a time in the range 5 to 60 minutes, thus removing organically-bound chlorine from said product, then separating said fraction from said hydrocarbon complex.

HAROLD J. HEPP.

References Cited in the file of this patent
UNITED STATES PATENTS

| Number | Name | Date |
|---|---|---|
| 2,143,050 | Berger | Jan. 10, 1939 |
| 2,207,760 | Russell | July 16, 1940 |
| 2,288,580 | Baehr | June 30, 1942 |
| 2,348,701 | Schmerling | May 9, 1944 |
| 2,378,733 | Sensel | June 19, 1945 |
| 2,382,814 | Proell et al. | Aug. 14, 1945 |
| 2,435,621 | Brooks | Feb. 10, 1948 |
| 2,474,827 | Condon | July 5, 1949 |